United States Patent [19]

Peterson et al.

[11] Patent Number: 4,656,640
[45] Date of Patent: Apr. 7, 1987

[54] MODULAR GAS LASER CATHODE ASSEMBLY

[75] Inventors: Royal D. Peterson, Alpharetta, Ga.; Ronald E. Jones, Cupertino, Calif.

[73] Assignee: Continental Laser Corporation, Mountain View, Calif.

[21] Appl. No.: 731,134

[22] Filed: May 6, 1985

Related U.S. Application Data

[63] Continuation-in-part of Ser. No. 692,787, Jan. 17, 1985.

[51] Int. Cl.⁴ .............................................. H01S 3/097
[52] U.S. Cl. ...................................... 372/87; 372/65; 372/98; 372/55
[58] Field of Search ....................... 372/87, 65, 61, 92, 372/98, 94, 109, 107, 103, 55, 81; 313/49.51

[56] References Cited

U.S. PATENT DOCUMENTS

| | | | |
|---|---|---|---|
| 3,599,107 | 8/1971 | Knudsen et al. | 372/61 |
| 3,670,261 | 6/1972 | Halsted et al. | 372/61 |
| 3,745,483 | 7/1973 | Huchital et al. | 331/94.5 |
| 3,792,373 | 2/1974 | Altman et al. | 331/94.5 |
| 4,477,907 | 10/1984 | McMahan | 372/61 |
| 4,612,648 | 9/1986 | Peterson et al. | 372/109 |

Primary Examiner—Leon Scott, Jr.
Attorney, Agent, or Firm—Thomas Schneck

[57] ABSTRACT

A cathode assembly for a gas laser housing has weldless sleeves for securing a cathode to the laser housing. A support flange, brazed or heliarc welded to a gas reservoir at one end of a laser tube, supports a cathode. Ceramic feedthroughs brazed or heliarc welded to holes in the flange bring wires through the flange while maintaining insulation therefrom. The helical cathode is joined to copper stubs from the feedthroughs by crimped conductive sleeves.

5 Claims, 3 Drawing Figures

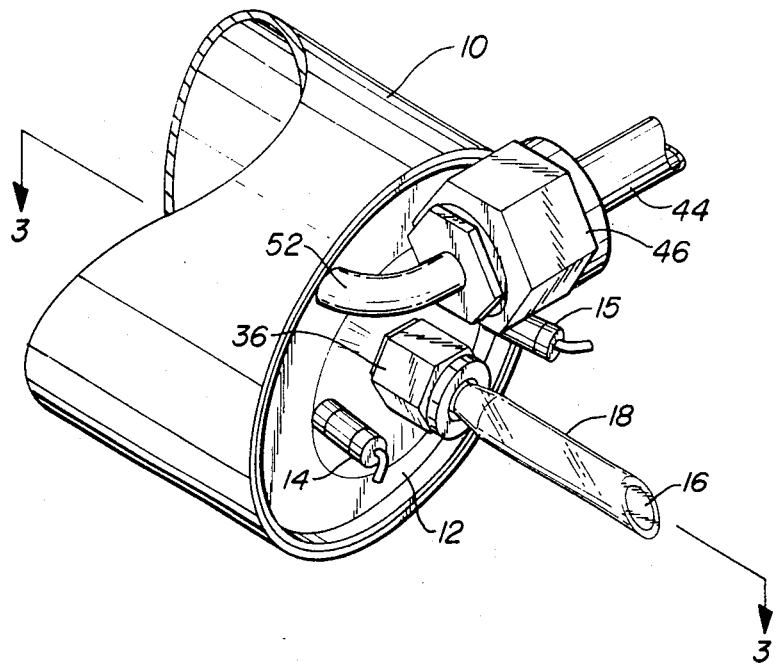
FIG._1.
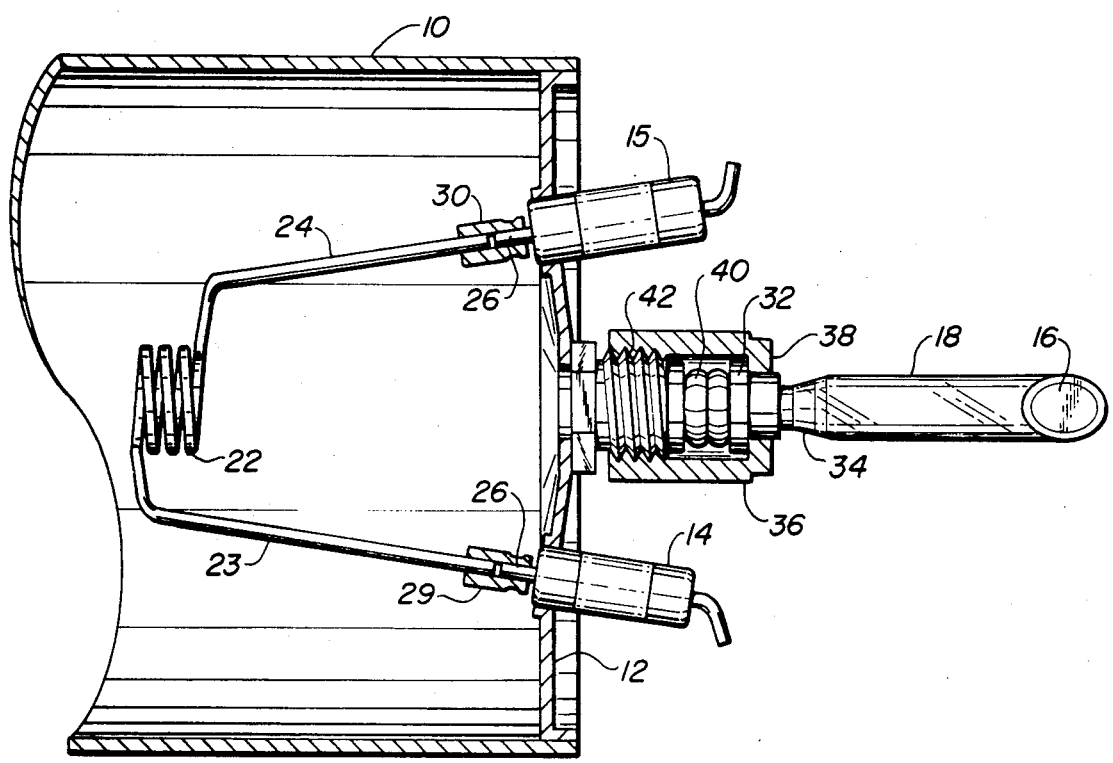
FIG._3.

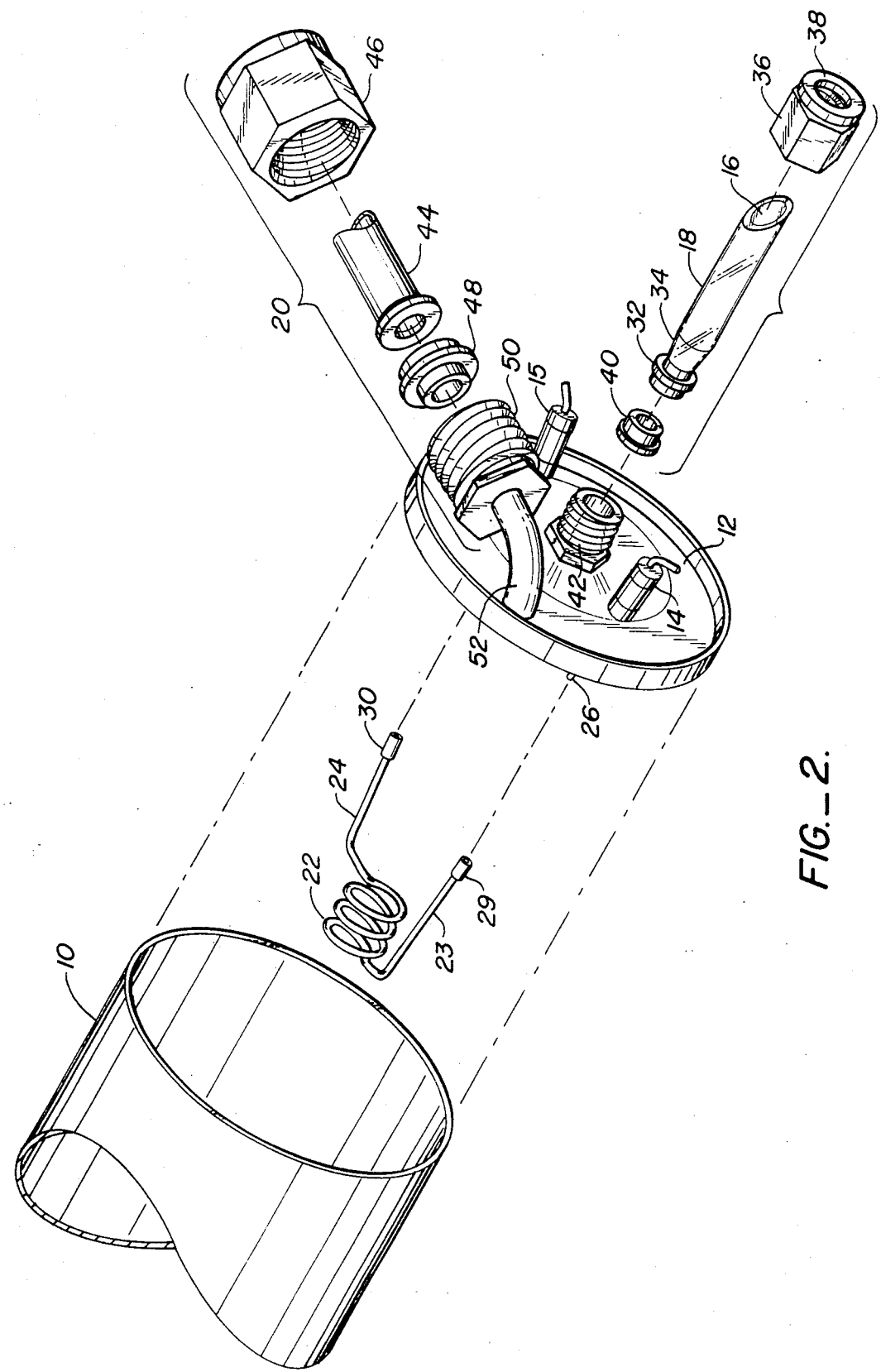
FIG._2.

_4,656,640_

MODULAR GAS LASER CATHODE ASSEMBLY

CROSS REFERENCE TO RELATED APPLICATION

This is a continuation-in-part of patent application Ser. No. 692,787 filed Jan. 17, 1985.

TECHNICAL FIELD

The present invention relates to an end assembly for a gas-discharge laser and in particular to an assembly in which the cathode is modular.

BACKGROUND ART

Altman et al. (U.S. Pat. No. 3,792,373) teaches a metal vapor laser in which the room temperature Brewster windows are isolated from the vapor to prevent metal condensation on the windows. The Brewster window is attached to the end of the electrode support tube. At the other end of the electrode support tube is a cathode electrode with a spherical surface. The laser tube is sealed to the electrode support tube by a connecting sleeve assembly with the help of O-rings, pressure limiting rings and threaded collars. The electrode support tube may be removed by disengaging the tube from the correcting sleeve assembly.

Huchital et al. (U.S. Pat. No. 3,745,483) teaches replaceable metal end members having electrodes and Brewster windows. The end members are secured to a glass cylinder through heat resistant gaskets. Hermetic seals are provided by interlocking flanges, overlapping collars, and bolts on the glass and metal members. The problem with most lasers is that the cathode electrode must be welded to the laser end assembly, which makes assembly difficult. Often defects in a weld are not discovered until the laser is filled and operated.

It is an object of the present invention to create a modular cathode assembly for gas lasers in which cathode assembly is simple and does not require welding of parts to the supporting flange.

DISCLOSURE OF INVENTION

These objects have been met with a laser cathode assembly for use in a gas laser housing having non-welded electrically conductive sleeves for joining the cathode to the housing. The housing is a gas laser tube with a gas reservoir mounted at one end. A support flange is welded to the end of the reservoir, where laser gas is contained. Onto this flange, a cathode is mounted. A pair of spaced apart ceramic feed-throughs bring copper electrode wires through the supporting flange, yet maintain electrical insulation therefrom. Short copper wire stubs project toward the cathode position from the center of the feedthroughs. The cathode has a pair of wires to be joined to the free ends of the stubs by means of conductive sleeves or swage tubes which are placed over the feed-through stubs and the cathode wires. The sleeves are then pinched so that the feed-through stubs and the cathode wires are electrically joined through the sleeves.

BRIEF DESCRIPTION OF THE DRAWINGS

FIG. 1 is a perspective view of the end assembly.
FIG. 2 is an exploded view of the end assembly of FIG. 1.
FIG. 3 is a sectional view taken on the plane 3-3' of FIG. 1.

BEST MODE FOR CARRYING OUT THE INVENTION

With reference to FIG. 1, a large axially symmetric reservoir 10, at an end of a gas laser tube, where laser gas is confined seats at its end a support flange 12. The laser itself is of the argon ion ceramic type, but is not restricted to this. The lengthwise axis of the laser is collinear with the axis of the reservoir. The flange 12 is a circular metal plate with holes for feed-throughs 14 and 15, a window assembly having Brewster cut window 16, and a gas feed assembly's L-shaped tube 52. The center of the flange 12 may be slightly curved. The flange 12 is heliarc welded or brazed to the reservoir 10.

Feed-throughs 14 and 15 provide electrical connections to a laser cathode. A glass tube 18 terminating in a Brewster angle window 16 bolted to the flange 12 provides a way for light to leave the reservoir 10. The window assembly is vacuum sealed to prevent laser gas from escaping the reservoir. The gas feed tube 44 is also bolted to the flange. The gas feed tube 44 is a means of supplying laser gas to the reservoir when the laser is first constructed and after the laser has been repaired.

With reference to FIG. 2, a large reservoir 10 for confining laser gas is heliarc welded or brazed on its end to the edges of circular metal support flange 12. The flange plate 12 supports the cathode structure, the Brewster window assembly, and the gas feed assembly, which together comprise the end assembly for a gas laser. The flange 12 has holes for feed-throughs 14 and 15, threaded Brewster extension 42, and L-shaped tube 52.

The cathode structure of the end assembly comprises feed-throughs 14 and 15, stubs 26, metal sleeves 29 and 30, cathode wires 23 and 24, and a cathode 22. A pair of ceramic feed-throughs 14 and 15 bring copper wires, for electrical connection to the cathode 22 through the flange 12, yet maintain electrical insulation from the flange 12. Short copper stubs 26 project toward the cathode position from the center of the feed-throughs 14 and 15. The cathode 22 is welded to cathode wires 23 and 24, and is disposed in axial alignment with the reservoir 10. The cathode 22 may be of a helical configuration, as shown, to permit the generated laser beam to pass axially therethrough. The cathode has a pair of wires 23 and 24 to be joined to the stubs by means of sleeves or tubes 29 and 30 which are placed over the feed-through stubs 26 and brazed to the cathode wires 23 and 24. Sleeve 29 is crimped so that stub 26 in feed-through 14 is electrically connected to cathode wire 23. Likewise, crimping sleeve 30 joins cathode wire 24 to stub 26 in feedthrough 15.

The Brewster window assembly comprises a threaded Brewster extension 42, a vacuum compression fitting 40, a metal extension member 32, glass Brewster tube 18, Brewster angle window 16 and nut 36. The Brewster assembly is constructed by passing a metal extension member 32 through a nut 36. The nut 36 has a shoulder 38, which engages an annular flange on extension 32 to prevent the extension 32 from passing all the way through the nut. The metal extension member 32 is joined to a glass tube 18 terminating in a Brewster angle window 16 forming a glass-to-metal bond at 34. A vacuum compression fitting 40 is placed in the nut 36 behind the extension member 32. The fitting 40 is a ring-shaped glass having a shoulder for alignment. The fitting 40 is a standard part in vacuum technology. When the nut 36 is screwed to the threaded Brewster extension 42, the compression fitting 40 gets squeezed between the threaded extension 42 and the metal extension member 32, forming a hermetic seal.

The Brewster window mounting assembly's ability to be unbolted from the support flange 12 facilitates periodic laser maintenance and easy reconstruction. Brewster window tubing 18 if damaged or broken, can now be replaced without discarding the entire laser tube. To replace a Brewster window 16, the nut 36 is first unscrewed from the threaded extension 42. The vacuum compression fitting 40 is removed. The metal extension member 32, glass Brewster tube 18, and Brewster angle windows 16 are removed and replaced with a new set. A new fitting 40 is inserted into the nut 36 behind the metal extension member 32, and the nut 36 is screwed onto the threaded extension 42. An identical assembly is mounted to the anode side of the laser tube.

Whenever the window 16 is replaced, the hermetic seal between reservoir 10 and the outside of the laser is broken and the reservoir needs to be evacuated and refilled with laser gas. In order to facilitate this reprocessing the gas feed assembly is also designed to be replaceable. The gas feed assembly comprises an L-shaped tube 52, a threaded extension 50, a vacuum compression fitting 48, a gas pinch-off tube 44, and a nut 46. This assembly works the same way as the Brewster window assembly. A metal L-shaped tube 52 is bonded to the support flange 12. On the end of this L-shaped tube 52 is a threaded extension 50. A gas pinch-off tube 44 is inserted into nut 46. The nut 46 has a shoulder on it to keep the pinch-off tube 44 from slipping completely through the nut 46. The tube 44 is typically made of copper. A vacuum compression fitting 48 is inserted into the nut 46 behind the pinch-off tube 44. When the nut 46 is screwed onto the threaded extension 50, the vacuum compression fitting is compressed, creating a hermetic seal.

During fabrication of the laser, after replacing the Brewster window, or when the laser needs refilling because of gas cleanup or absorption, the outer end of the tube 44 is connected to a vacuum pumping and baking apparatus for evacuating the reservoir 10. Then, the tube is connected to a source of the desired gaseous laser medium, and the reservoir is filled with gas to the desired pressure. After the completion of the gas filling operation, the outer end of the tube 44 is pinched shut to completely seal the reservoir 10, and thus maintain the desired laser pressure.

The tube 44 is designed to be replaced during each repair of the end assembly. The gas pinch-off tube 44 is removed and replaced in the same way as the Brewster window 16. The nut 46 is unbolted from the threaded extension 50. The vacuum compression fitting 48 and pinch-off tube 44 are removed. New pinch-off tube 44 and vacuum compression fitting 48 are inserted into the nut 46, and the nut 46 is screwed onto the threaded extension 50. When this is done, the gas fill assembly can be used to refill the laser reservoir 10 with gas.

FIG. 3 shows section 3—3 of FIG. 1 of the end assembly. The crimped metal sleeves 29 and 30 hold cathode wires 23 and 24 and stubs 26 in electrical contact and supports the cathode 22. The ceramic feedthroughs 14 and 15 are bonded in holes of the support flange 12, and provide passage of wires through the flange 12 while maintaining electrical insulation therefrom.

Vacuum compression fitting 40 is being compressed by threaded extension 42 and metal extension member 32, thereby forming a hermetic seal. The nut shoulder 38 keeps the metal extension member 32 with flange from slipping completely through the nut and applies pressure to the fitting 40 via the extension member 32. Shoulders on the extension member 32 and fitting 40 not only keep these parts from slipping out of the nut 36, but also maintain their relative alignment so leaks do not occur. The center of cathode 22, the threaded extension 42, the vacuum compression fitting 40, the metal extension member 32, the glass tube 18, and the Brewster angle window 16 are all aligned with the central axis of the laser. The cathode 22 is helical, and the other parts are roughly cylindrical so that light may propagate along the axis and out the window 16.

We claim:

1. In a gas laser, a construction for a cathode assembly comprising, a laser tube including a housing, cathode electrode means disposed within the housing at an end of the tube for providing ionizing electrons to a gas medium in said housing, said electrode means terminating in at least one cathode wire located entirely inside of the laser tube, feedthrough means bonded to said housing for bringing electrically conductive leads into said housing into electrical communication with the cathode wire while maintaining insulation of said leads, swaged electrically conducting sleeve means located inside said laser tube for mechanically securely joining in electrical conduction said leads to said cathode wire.

2. A construction for laser cathode assembly for use within a laser housing comprising, first and second wires having first and second ends, the second ends joined to opposite ends of an electron emitting cathode, the first ends being straight and spaced apart by a first distance, a laser housing for confining a lasing medium and the entirety of said first and second wires, the housing having first and second insulative feedthroughs and having conductive wires extending through the housing with free ends extending toward the lasing medium, the feedthrough wires being spaced apart by said first distance, a pair of electrically conductive sleeves, each sleeve disposed over one of said first ends of the first and second wires and over the free end of each of said feedthrough wires, said sleeves being crimped in place.

3. A construction for cathode mounting assembly for use in a gas discharge tube comprising, a cathode electrode means mounted in a gas reservoir at one end of a gas discharge tube for providing ionizing electrons to a gas medium in said tube, two cathode wires entirely within said gas reservoir, each joined at one end to opposite ends of said cathode electrode means and spaced apart at a second end by a distance, support means, to which said cathode is mounted, bonded to the end of said gas reservoir for supporting said cathode in said gas reservoir, two electrically insulating feedthroughs bonded to said support means and spaced apart by said distance, each of said feedthroughs having a wire lead extending through the center thereof, said leads terminating in stubs inside said gas reservoir, and two electrically conducting sleeves, each of said sleeves fitted over one of said stubs and a second end of one of said cathode wires, said sleeves being crimped for securely joining in electrical conduction said wire leads to said cathode wires.

4. A method for assembling a laser cathode comprising,
   extending a spaced apart pair of conductive electrode wires through a laser housing,
   providing a wire cathode entirely within said laser housing, the cathode having wire ends spaced apart at the same distance as said conductive electrode wires, and
   deforming electrically conductive sleeves connecting each of the electrode wires to a wire end of the cathode.

5. A method for mounting a cathode assembly comprising,
   affixing two electrically insulating feedthroughs to a support means, said feedthroughs being spaced apart by a distance, each of said feedthroughs having a wire lead extending therethrough, the leads terminating in stubs,
   fitting each of a pair of electrically conducting sleeves over one of said stubs,
   fitting one of the ends of each of a pair of cathode wires into said sleeves, each of said cathode wires joined at the end opposite said sleeves to opposite ends of a cathode electrode,
   crimping said sleeves for securely mechanically joining in electrical conduction said leads to said cathode wires, and
   connecting said support means to the end of a gas discharge tube, said cathode being thereby mounted inside said tube.

* * * * *